March 16, 1937.  H. SCHRADER  2,074,242
TOOL FOR STRIPPING ENDS FROM CONTAINERS
Filed May 21, 1935
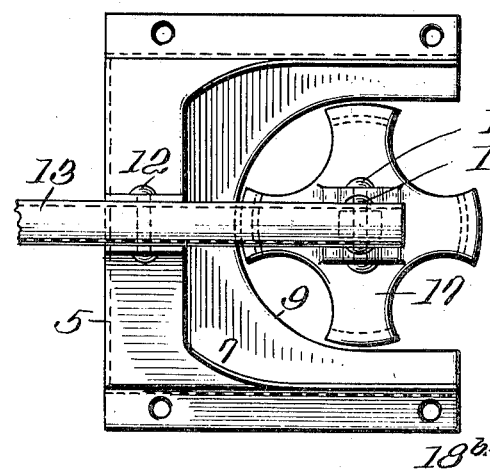
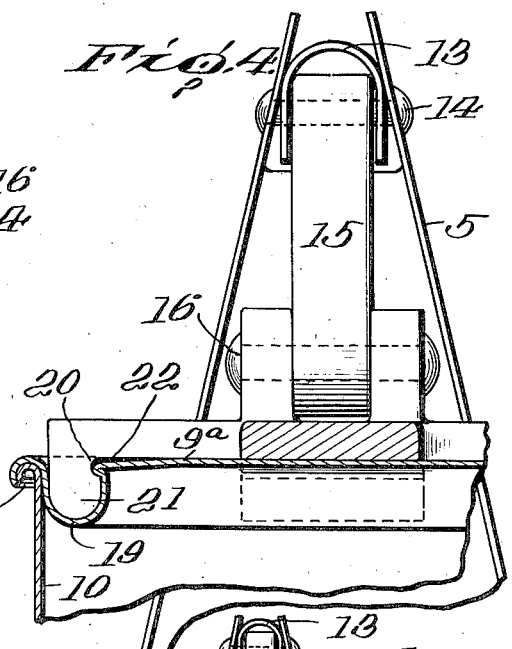
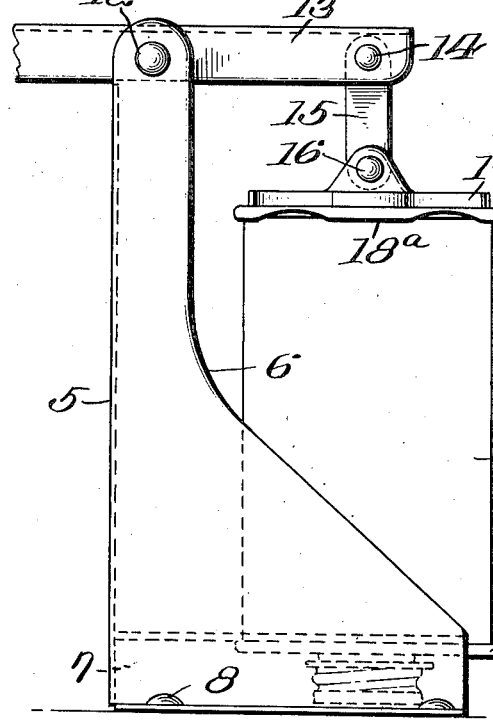
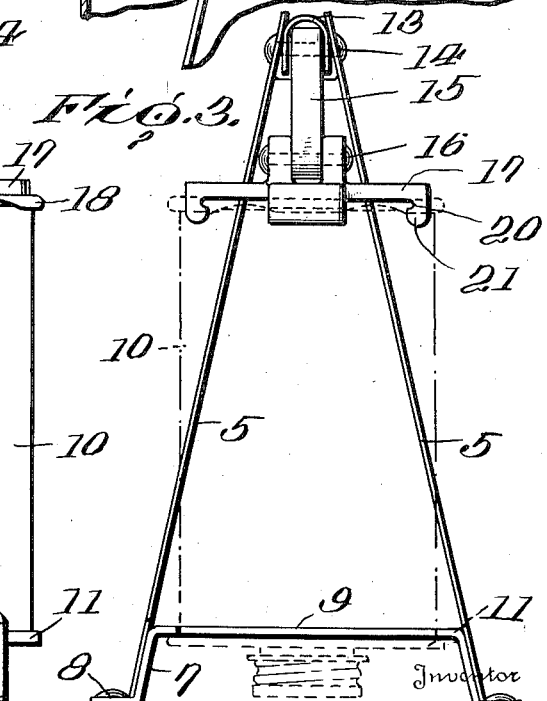
Inventor
Herbert Schrader
By Mason & Porter
Attorneys Patented Mar. 16, 1937

2,074,242

UNITED STATES PATENT OFFICE 2,074,242

TOOL FOR STRIPPING ENDS FROM CONTAINERS

Herbert Schrader, Wheeling, W. Va., assignor to Continental Can Company, Inc., New York, N. Y., a corporation of New York Application May 21, 1935, Serial No. 22,611

5 Claims. (Cl. 81—3.1)

The invention relates to new and useful improvements in a tool for forcibly stripping a container end from a container body.

An object of the invention is to provide a tool to which a container body and container end may be attached and wherein a pulling force may be exerted on the end for stripping the same from the container body.

A further object of the invention is to provide a tool of the above type wherein a stripper head for pulling the bottom end from the container may be positively attached to said bottom end by a rotation of the container relative to said head.

These and other objects will in part be obvious and in part hereinafter more fully disclosed.

Referring to the drawing, Fig. 1 is a top plan view of the tool for stripping the ends from container bodies.

Fig. 2 is a view taken in side elevation of the same.

Fig. 3 is a view taken in front elevation of the improved tool.

Fig. 4 is an enlarged view partly in vertical section of the stripper head.

In an application filed of even date herewith, Serial No. 22,610, I have shown and described a container adapted to be used with a grease gun for dispensing heavy bodied grease. The container referred to is illustrated more or less diagrammatically in the drawing and consists of a body portion 10. An end carrying the dispensing nozzle is double seamed to the body as indicated at 11. The bottom end 18 has spaced portions 18a thereof crimped around the bead 18b at the end of the container body for attaching the end to said body. The bottom end also is provided with an annular recess 19 and a paneled portion 19a. The paneled portion 19a is bumped at intervals to provide projections 20 which overhang the recess 19. The purpose of these projections will be hereinafter more fully described.

The present invention is directed to a tool for stripping the bottom end from a container of the type described above. The improved tool consists of an upright frame which may be attached to any suitable support. Secured to the frame is a retainer member having a recess conforming to the body of the container so as to center the container and so as to engage the body adjacent the double seam thereof. The retainer member is spaced sufficiently from the bottom of the frame member to allow clearance for the dispensing end of a container. A stripper head or chuck is mounted on the frame member so that it may be moved toward and from the retainer member. The stripper head is provided with spaced lugs which are adapted to be placed beneath the projecting portions on the bottom end of a container for attaching said stripper head to the container end. The retainer member holds the container against endwise movement and upon applying a pulling force to the stripper head, the bottom end will be forcibly and easily removed from the container.

Referring more in detail to the drawing, a tool for stripping ends from container bodies is indicated at 5. The tool comprises an upright frame member 6 which is welded to the sides of a retainer member or bracket 7. The retainer member or bracket 7 may be attached to the wall or any suitable support by screws 8 as indicated in the drawing. The retainer member 7 has a U-shaped cut-away portion 9 which provides a recess for receiving and centering a container body. The radius of the cut-away portion or recess is slightly greater than the outside diameter of the container body 10 and less than the outside diameter of the double seam 11. The height of the retainer member or bracket from its base is sufficient to allow clearance for the dispensing end of the container. The position of a container inserted within the recess of the retaining member is shown in Figs. 2 and 3 of the drawing. It will be noted since the radius of the recess is less than the radius of the outside diameter of the seam of the container that the container is held against endwise movement by the retaining member.

Attached to the upper end of the supporting frame by a suitable pivot member 12 is a lever 13. Attached to the end of the lever 13 by a suitable pivot 14 is a short link 15. Carried by this link 15, is a stripper head or chuck 17 which strips the container end indicated at 18 from the container body 10. Said stripper head is attached to the link by a pivot member 16.

As described above, the container end is provided with a recess 19 and has projections 20 overhanging said recess. The stripper head 17 has spaced lugs 21 and recesses or cut-away portions 22. The lugs are so dimensioned as to fit in the recess 19 of the container end and are adapted by a relative turning movement of the container end in respect to the stripper head to be placed beneath the projecting portions 20 on the container end.

To remove the bottom end from a container, the container is placed in the U-shaped recess in the retainer member with the dispensing nozzle down. The double seam of the container is engaged beneath the flange of the retainer member and the container is thereby held against endwise movement in an upward direction. The lugs 21 on the stripper head are then placed in the U-shaped recess 19 of the container end and the container is given a slight turning movement by the hand until the projections 20 of said end are placed in the recess 22 provided therefor, and the container end is thereby attached to the lugs on the stripper head. The lever or handle is now pressed down and the container end 18 is detached from the container body.

From the above it will be apparent that a tool has been devised for readily and quickly removing clinched ends from container bodies. While the pulling force for stripping the container end is accomplished by a lever and link in the present invention, it might easily be accomplished by any other well known mechanical means.

It is obvious that minor changes in the details of construction and the arrangement of parts may be made without departing from the spirit of the invention as set forth in the appended claims.

Having thus described my invention, what I claim as new and desire to secure by Letters Patent, is:—

1. A tool for stripping a clinched container end from the body thereof comprising a supporting frame including a retainer member having a recess conforming to the container and adapted to engage beneath the double seam joining the top end of the container to the body, a stripper head, means for attaching said stripper head to the bottom end of the container, a lever carried by said frame, a link connecting said lever to said stripper head whereby said stripper head may be moved away from said retainer member for forcibly stripping said bottom end from the container body.

2. A tool for stripping a clinched container end from the body thereof comprising a supporting frame including a retainer member having a recess conforming to the container and adapted to engage beneath the double seam joining the top end of the container to the body, a stripper head, said stripper head having spaced lugs adapted to be placed beneath projecting portions on the bottom end of the container for attaching said stripper head to said container, and means for moving said stripper head away from said retainer member for forcibly stripping the bottom end from the container body.

3. A tool for stripping a clinched container end from the body thereof comprising holding means for engaging the container body to prevent endwise movement thereof and to center the same, a stripping head having recesses therein for engagement with projecting portions within the container end, and means for imparting a pulling force to said stripping head for separating the container end from the body.

4. A tool for stripping a clinched container end from the body thereof comprising a supporting frame having a retaining member provided with a recess conforming to the shape of the container and adapted to engage the container body adjacent the double seam joining the top end of the container to the body whereby to center the container body and prevent endwise movement thereof, a stripping head having depending recessed lugs engageable with the bottom end of the container, and means carried by said frame for moving said stripping head relative to the frame whereby to remove the bottom member of the container.

5. A tool for stripping a clinched container end from the body thereof comprising a supporting frame having a retaining member provided with a recess conforming to the shape of the container and adapted to engage the container body adjacent the double seam joining the top end of the container to the body whereby to center the container body and prevent endwise movement thereof, a stripping head having depending recessed lugs engageable with the bottom end of the container, a lever carried by said frame, and means connecting said lever to said stripping head whereby to forcibly strip the bottom end of the container from the container body when force is applied to said lever.

HERBERT SCHRADER.